UNITED STATES PATENT OFFICE

ERNST RUNNE, KARL MOLDAENKE, AND ERNST FISCHER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

ALKOXY-3-KETO-DIHYDRO-THIONAPHTHENES AND PROCESS OF MAKING THEM

No Drawing. Application filed September 18, 1928, Serial No. 306,781, and in Germany October 8, 1927.

Our present invention relates to alkoxy-3-keto-dihydro-thio-naphthenes and process of making them.

According to the statements by Gattermann et al. in "Berichte der Deutschen Chemischen Gesellschaft" volume 23, page 1199 and volume 29, page 824, the action of aluminium chloride upon a phenol ether, for instance upon phenolalkyl ether, ortho-methoxybenzoyl chloride or the like, is that of easily splitting and desalkylating it. It therefore could have been expected that aluminium chloride would also split off the alkyl groups from alkoxy-aryl-thioglycollic acid chlorides.

We have, however, found that by causing aluminium chloride to act upon a halide, particularly a chloride of an alkoxy-aryl-thioglycollic acid, alkoxy-keto-dihydro-thionaphthenes are obtained in a smooth reaction with closure of the ring. Thus a new way has been found for preparing these compounds, which have hitherto been made either from alkoxy-aryl-thioglycollic acids by means of chlorosulfonic acid or a similar agent or from alkoxy-aryl-thioglycollic acids containing a CN, CO—$NH_2$ or COOH group in ortho-position to the sulfur. The new method is of great technical importance in all cases where the ring-closing agents, as for example chlorosulfonic acid, fail to act or where alkoxy-aryl-thioglycollic acids containing in ortho-position to the sulfur a substituent of the above-indicated kind are only difficultly accessible.

The reaction is advantageously carried out in presence of a solvent at a mild temperature and directly following the manufacture of alkoxy-aryl-thioglycollic acid halides.

Our invention is illustrated, but not limited by the following examples, in which the parts are by weight:

1. 21.2 parts of 1-methyl-6-chloro-4-methoxybenzene-3-thioglycollic acid are transformed into the chloride in known manner in chlorobenzene by means of thionyl chloride. 16 parts of aluminium chloride are gradually entered into the solution at 30° C., the whole is then further stirred for some time at 30° C. to 40° C. and the chlorobenzene is driven off by means of steam. The keto-dihydro-thionaphthene thus obtained of the formula:

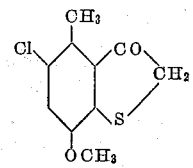

and likewise the symmetrical dyestuff obtainable therefrom are identical with the products to be expected and obtained according to known methods.

2. 26.2 parts of 6-ethoxynaphthalene-2-thioglycollic acid melting at 122° C., obtainable by reducing 6-ethoxynaphthalene-2-sulfochloride to the mercaptan and condensing the latter with monochloroacetic acid, are transformed into the chloride in the presence of chlorobenzene by means of phosphorus trichloride. There are then entered, while gently heating, 15 parts of aluminium chloride. After having subsequently stirred the mass for one hour, the chlorobenzene is driven off with steam and the ethoxy-4.5-benzo-keto-dihydro-thionaphthene of the formula:

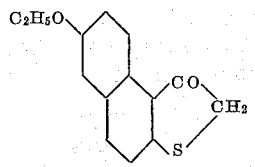

which remains in a good yield is recrystallized from glacial acetic acid. It melts at 142° C to 144° C.

In an analogous manner the keto-dihydro-thionaphthenes are prepared from other alkoxy-aryl-thioglycollic acids of the benzene- or naphthalene series, and the aryl nucleus may contain further substituents as for instance halogen, alkyl or the like. 4-ethoxy-naphthalene-1-thioglycollic acid of the melting point 95° C. to 96° C. yields for example an ethoxy-6.7-benzo-keto-dihydro-thionaphthene which after recrystallization from ligroin melts at 157° C. to 158° C. Isomeric keto-dihydrothionaphthene derivatives are formed from the 7-methoxy-naphthalene-1-thioglycollic acid of the melting point 116° C. to 117° C., from the 4-ethoxy-naphthalene-2-thioglycollic acid of the melting point 121° C., from the 7-methoxy-naphthalene-2-thioglycollic acid of the melting point 161° C. to 162° C. and from other thioglycollic acids.

We claim:

1. The process of preparing alkoxy-3-keto-dihydro-thionaphthenes which consists in treating an alkoxy-aryl-thioglycollic acid halide having at least one free ortho-position to the thioglycollic residue with an aluminium halide.

2. The process of preparing alkoxy-3-keto-dihydro-thionaphthenes which consists in treating an alkoxy-aryl-thioglycollic acid chloride having at least one free ortho-position to the thiogylcollic residue with aluminium chloride, in presence of a solvent.

3. The process of preparing alkoxy-3-keto-dihydro-thionaphthenes which consists in treating an alkoxy-naphthalene-thioglycollic acid halide having at least one free ortho-position to the thioglycollic residue with an aluminium halide.

4. The process of preparing alkoxy-3-keto-dihydro-thionaphthenes which consists in treating an alkoxy-naphthalene-thioglycollic acid chloride having at least one free ortho-position to the thioglycollic residue with aluminium chloride, in presence of a solvent.

5. The process of preparing ethoxy-4.5-benzo-3-keto-dihydro-thionaphthene which consists in treating 6-ethoxy-naphthalene-2-thioglycollic acid chloride with aluminium chloride, in presence of a solvent.

6. The process of preparing ethoxy-4.5-benzo-3-keto-dihydro-thionaphthene which consists in treating 6-ethoxy-naphthalene-2-thioglycollic acid chloride with aluminium chloride, in presence of chlorobenzene while gently heating.

7. As new products, the compounds of the following general formula:

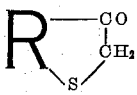

wherein R stands for an alkoxy-naphthalene residue.

8. As new products, the compounds of the following formula:

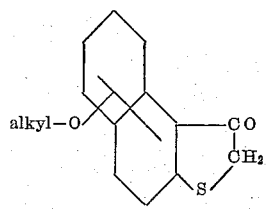

9. As a new product, the ethoxy-4.5 benzo-3-keto-dihydro-thionaphthene of the formula:

melting at 142° C. to 144° C.

In testimony whereof, we affix our signatures.

ERNST RUNNE.
KARL MOLDAENKE.
ERNST FISCHER.